3,214,306
PREPARATION OF RADIATION-CURED ELASTOMERIC ROCKET PROPELLANTS
Eugene L. Colichman, Los Angeles, and Frank B. Cramer, Reseda, Calif., assignors to North American Aviation, Inc.
No Drawing. Filed May 28, 1956, Ser. No. 588,210
2 Claims. (Cl. 149—19)

Our invention relates to improved elastomeric rocket propellants, and more particularly to a method of preparing improved elastomeric rocket propellants.

Solid rocket propellants generally are composed of a rocket fuel-binder, an oxidant and a combustion catalyst. A typical composition is: 22% Thiokol, a trademarked synthetic polysulfide rubber (as fuel-binder), 75% ammonium perchlorate or nitrate (as oxidant), 1% iron oxide (as combustion catalyst), and 2% curing agents. A conventional method of preparing these rocket propellants is to place the viscous mixture of the above components into a rocket housing and heating the rocket and contents for about 24 to 72 hours at 65° C. This treatment serves to polymerize the mixture into the desired elastomeric rocket propellant composition. Such a preparation method is generally satisfactory, but a number of drawbacks have become apparent. For example, thermal stresses are introduced which may cause failure. Also, the exhaust by-product gases from sulphur-containing compositions such as Thiokol are corrosive and damaging to engine intake manifolds of jet airplanes firing rockets. Furthermore, with curing agents incorporated into the propellant mixture, there will be a "pot-life" problem due to curing and handling. A typical "pot-life" of solid propellant fuels is about two hours, which means that all mixing and loading must be accomplished within this period.

A still more serious problem arising from conventional curing methods is the restriction on the choice of elastomers. It is known that a number of hydrocarbons would make excellent fuels, but these cannot be cured (i.e., polymerized) in the presence of the oxidant by heat and chemical free radical forming catalysts. Furthermore, even in the absence of the oxidant, conventional chemical polymerization catalysts and heating will not cause polymerization of many such hydrocarbons. As a result of this, the potential variety of elastomeric rocket propellants has been reduced. An object of our invention, therefore, is to provide an improved method of preparing elastomeric rocket propellants.

Another object is to provide improved elastomeric rocket propellants.

Another object is to prepare such new elastomers with hydrocarbon fuel not containing sulphur or other corrosive agents.

Another object is to provide an improved method of curing such elastomers which will not introduce thermal stresses into the resulting composition.

Still another object is to provide such a curing method which avoids "pot-life" problems.

Further objects and advantages of our invention will become apparent from the following detailed description and the appended claims.

In accordance with our invention, we have provided an improved method of preparing a hydrocarbon elastomeric rocket propellant composition which comprises curing a liquid hydrocarbon fuel composition by ionizing radiation.

By employing our radiation-curing method, we have greatly improved the preparation of elastomeric rocket propellants. Failure due to thermal stresses has been avoided and considerable latitude in handling has been achieved by avoiding "pot-life" problems through elimination of the curing agent. Furthermore, we have prepared hydrocarbon compositions that were previously not obtainable by conventional curing techniques. A whole new class of superior fuels has been thereby obtained and previous problems with corrosive gases have been avoided.

Our general method for preparing hydrocarbon compositions into elastomeric oxidant mixtures suitable for direct use as solid rocket propellants comprises mixing approximately 20–25 wt. percent of the hydrocarbon fuel-binder with approximately 70–80 wt. percent of an oxidant and approximately 1–5 wt. percent of a combustion catalyst. No curing agent is necessary. The choice of suitable hydrocarbon fuels which yield high energy on oxidation for our rocket propellant composition is quite broad, including both aliphatics and aromatics, and their nitrogen derivatives. Examples of suitable hydrocarbons include natural liquid rubber, polybutadiene, divinylbenzene, and paraffin wax. The oxidant is not critical and may be selected from strongly oxidizing inorganic compounds such as peroxides, chlorates, perchlorates and nitrates. Satisfactory examples are ammonium nitrate, sodium and potassium nitrates, and sodium and potassium perchlorates, while ammonium perchlorate is preferred. The fuel burning catalyst is not critical, some suitable examples being manganous dioxide, nickel oxide, cobalt oxide, and iron oxide. Iron oxide is preferred.

The resulting composition is then radiation-cured at the ambient atmospheric temperature into a solid elastomeric mass. The source of ionizing radiations may satisfactorily vary, but we find that X-rays and electrons (from particle accelerators) are quite suitable. Gamma radiation, such as obtained from cobalt-60 is preferred for uniformity of penetration and dosage. The optimum dose of radiation will vary somewhat with the particular composition. However, we find that a dose of approximately $5 \times 10^7$ to $5 \times 10^9$ roentgen (or equivalent roentgen for electrons) is satisfactory, while a dose of approximately $2 \times 10^8$ roentgen is preferred. More or less rigid elastomers can be made by varying the above radiation dose.

The following examples are offered to illustrate our invention in greater detail.

*Example I*

Approximately 25 wt. percent depolymerized liquid rubber (100% natural crude rubber in flowable form) was mixed with 70 wt. percent ammonium perchlorate and 5 wt. percent iron oxide. The resulting composition was subjected to a dose of $2 \times 10^8$ roentgen by means of cobalt-60 gamma radiation. A solid elastomeric propellant composition was obtained.

*Example II*

The composition of Example I was subjected to a dose of $2.4 \times 10^8$ equivalent roentgen by means of 1 mev. electrons at a dose of 1 microamp hr./gm., or 1 watt hr./gm. A solid elastomer was obtained.

*Example III*

Approximately 20 wt. percent liquid polybutadiene was mixed with 78 wt. percent ammonium nitrate and 2 wt. percent iron oxide and was subjected to a radiation dose of $2 \times 10^8$ roentgen with cobalt-60 gamma rays. A solid elastomeric composition was obtained.

*Example IV*

The composition of Example III was subjected to a dose of $2.4 \times 10^8$ equivalent roentgen by means of 1 mev. electrons at a dose of 1 microamp-hr./gm., or 1 watt hr./gm., and a solid elastomer again resulted.

*Example V*

A mixture comprising approximately 25 wt. percent liquid furan rubber, 72 wt. percent ammonium perchlorate and 3 wt. percent iron oxide was irradiated with a total dose of $2 \times 10^8$ roentgen with cobalt-60 gamma rays. A solid elastomer was similarly obtained.

*Example VI*

The composition of Example V was subjected to a dose of $2.4 \times 10^8$ equivalent roentgen by means of 1 mev. electrons at a dose of 1 microamp-hr./gm., or 1 watt hr./gm. A solid elastomer composition resulted.

*Example VII*

A mixture comprising 20% divinylbenzene, 77 wt. percent ammonium nitrate and 3% iron oxide was irradiated with cobalt-60 gamma rays to the extent of $1 \times 10^7$ roentgen. A solid composition was again obtained.

*Example VIII*

A mixture comprising 25 wt. percent paraffin wax, 73% ammonium nitrate and 2% iron oxide was subjected to a dose of $4.8 \times 10^9$ equivalent roentgen with 1 mev. electrons at a dose of 20 microamp-hr./gm. or 20 watt hr./gm., resulting in the formation of a solid elastomer.

The above examples are merely illustrative and not restrictive of our invention. Suitable changes may be made by those skilled in the art in the hydrocarbon, the oxidant, and the combustion catalyst without departing from the spirit of our invention. Our invention, therefore, should be limited only as is indicated by the appended claims.

Having thus described our invention, we claim:

1. A method of preparing a hydrocarbon elastomeric rocket composition which comprises forming a liquid mixture containing: hydrocarbon fuel-binder selected from the group consisting of natural rubber, polybutadiene, divinylbenzene, paraffin wax and furan rubber; an inorganic oxidant selected from the group consisting of peroxides, chlorates, perchlorates and nitrates; and a metal oxide combustion catalyst selected from the group consisting of manganous dioxide, nickel oxide, cobalt oxide, and iron oxide; and then subjecting the resulting mixture to high energy radiation to a total radiation dose of approximately $5 \times 10^7$ to $5 \times 10^9$ roentgen.

2. A method of preparing an elastomeric hydrocarbon rocket composition which comprises forming a liquid mixture containing approximately 20–25 wt. percent of a fuel-binder selected from the group consisting of natural liquid rubber, polybutadiene, divinylbenzene, paraffin wax and furan rubber; and approximately 70–80% of inorganic selected from the group consisting of perchlorates, chlorates, nitrates and peroxides; and approximately 1–5 wt. percent of a metal oxide combustion catalyst selected from the group consisting of manganous oxide, iron oxide, nickel oxide and cobalt oxide; and then subjecting the resulting mixture to a total radiation dose of approximately $5 \times 10^7$ to $5 \times 10^9$ roentgen.

References Cited by the Examiner

UNITED STATES PATENTS

| 1,906,402 | 5/33 | Newton | 204—154 |
|---|---|---|---|
| 2,740,702 | 4/56 | Mace | 52—0.5 |
| 2,791,883 | 5/57 | Moore. | |
| 2,877,504 | 3/59 | Fox. | |

FOREIGN PATENTS

| 1,079,401 | 5/55 | France. |
|---|---|---|

OTHER REFERENCES

Arendale: "Ind. and Eng. Chem.," vol. 48, pp. 725, 726, April 1956.

Ballantine: "Modern Plastics," November 1954, pp 131–132, 134, 136, 142, 228–230, 232.

Bopp et al.: "U.S. AEC Document ORNL–1373," pp. 1–24, 52–71, July 23, 1953.

Buchanan et al.: "Ind. and Eng. Chem," vol. 48, pp. 730, 731, April 1956.

Hackh: "Chemical Dictionary," 3rd edition, pp. 863, 864, 1950.

Penner: "J. Chem. Education," January 1952, pp. 37–39.

Ryan; "Nucleonics," vol. 11, pp. 13–15, August 1953.

Zaehringer: "Chem. Engineering Progress," vol. 51, p. 302, July 1955.

REUBEN EPSTEIN, *Primary Examiner.*

CARL D. QUARFORTH, WILLIAM G. WILES, ROGER L. CAMPBELL, *Examiners.*